Dec. 22, 1925.  
F. E. CROTTO  
1,566,653  
GATE AND CLAMPING DEVICE FOR WIRE LINE CLAMPS  
Filed Oct. 28, 1924  2 Sheets-Sheet 1
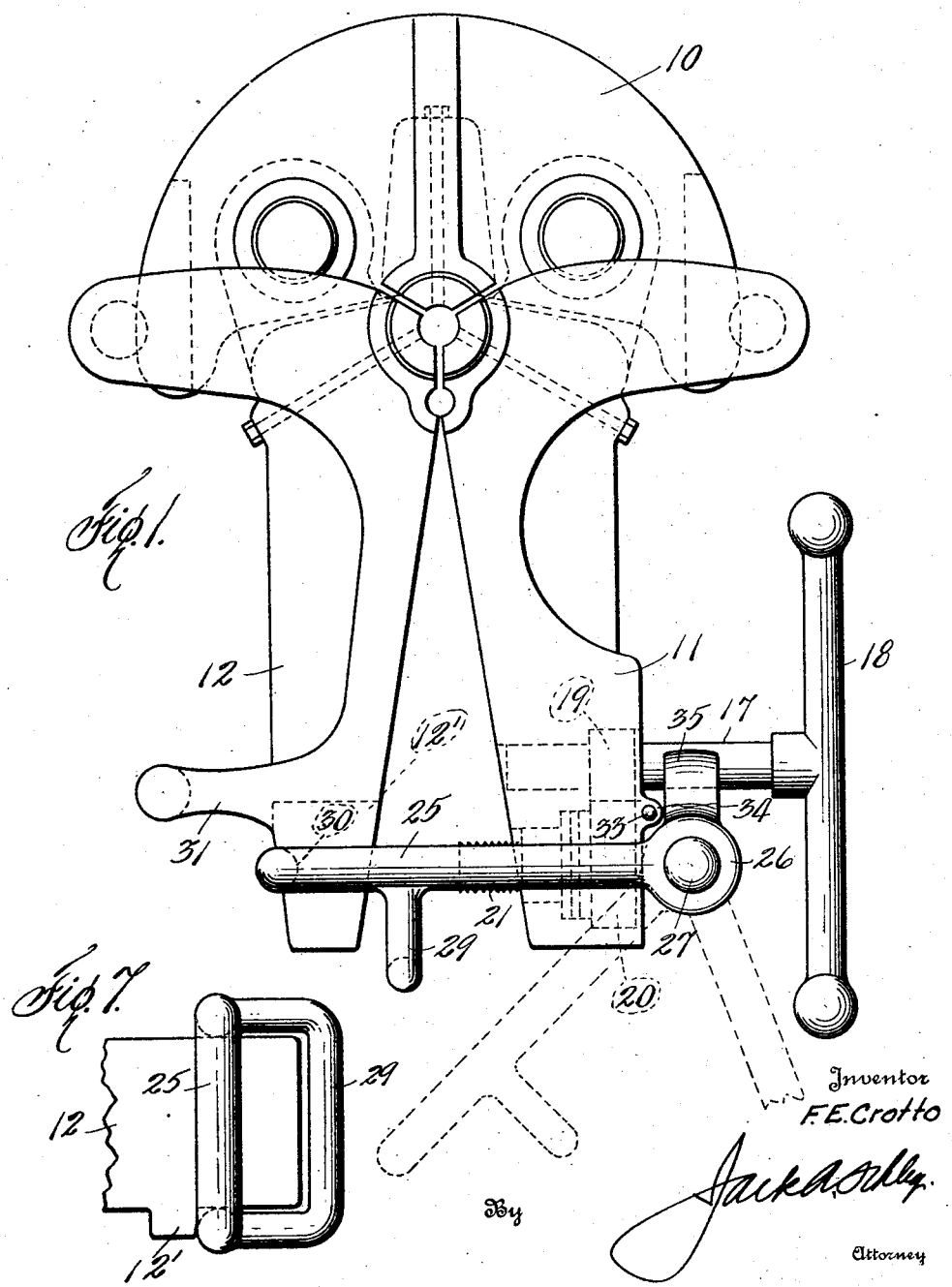

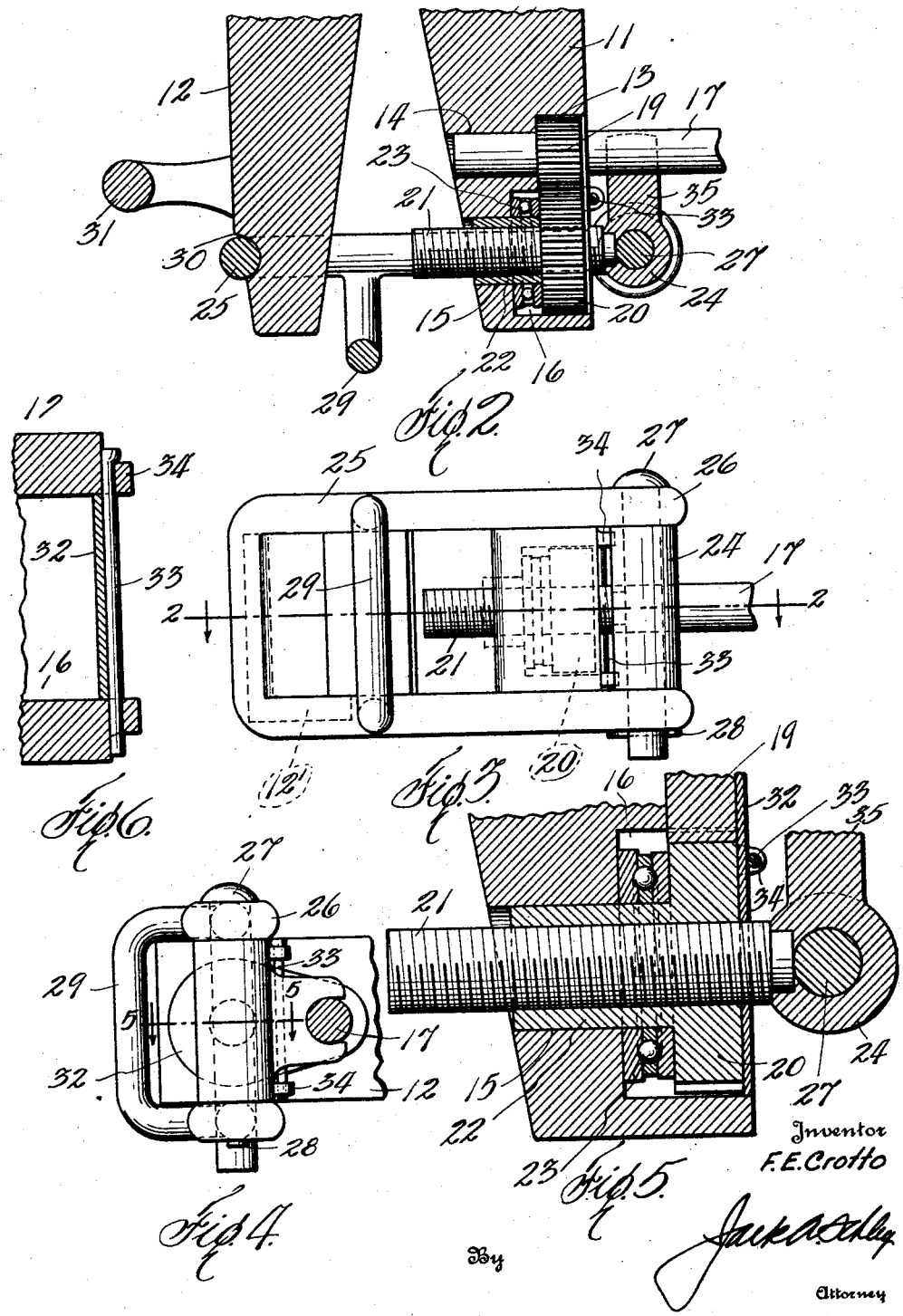

Patented Dec. 22, 1925.

1,566,653

UNITED STATES PATENT OFFICE.

FRANK E. CROTTO, OF TULSA, OKLAHOMA, ASSIGNOR TO WESTERN SUPPLY COMPANY, OF TULSA, OKLAHOMA.

GATE AND CLAMPING DEVICE FOR WIRE-LINE CLAMPS.

Application filed October 28, 1924. Serial No. 746,259.

*To all whom it may concern:*

Be it known that I, FRANK E. CROTTO, citizen of the United States of America, residing at Tulsa, in the county of Tulsa and State of Oklahoma, have invented certain new and useful Improvements in Gates and Clamping Devices for Wire-Line Clamps, of which the following is a specification.

This invention relates to new and useful improvements in gates and clamping devices for wire line clamps.

The object of the invention is to provide a gate for a wire line clamp, whereby greater leverage may be had for clamping the line and ease of operation and freedom of movement of the clamp may be secured.

A further object is to provide a gate that may be quickly swung and moved out of the path of the tool stem or bailer.

Another object is to provide a reduction gearing for drawing the clamping arms together to clamp the line, whereby a closer adjustment as well as effective clamping may be had with a minimum effort.

A still further object of the invention is the provision of convenient handles for manipulating the clamp and pulling it onto the line.

A construction designed to carry out the invention will be hereinafter described together with other features of the invention.

The invention will be more readily understood from a reading of the following specification and by reference to the accompanying drawings, in which an example of the invention is shown, and wherein:

Fig. 1 is a plan view of a clamp equipped with a gate constructed in accordance with my invention, Fig. 2 is a cross-sectional view on the line 2—2 of Fig. 3, Fig. 3 is an end view of the clamp and gate, Fig. 4 is a side view of the gate and clamp arm, Fig. 5 is an enlarged sectional view taken on the line 5—5 of Fig. 4, Fig. 6 is a detail of dust plate fastening, and Fig. 7 is a partial side elevation of arms showing the stop for limiting the closing of the gate.

In the drawings the numeral 10 designates the clamp head and 11 and 12, respectively the clamping arms of a wire clamp, which may be of the type shown in my Letters Patent No. 1,482,460 issued February 5th, 1924, or any other type of wire line clamp to which the invention could be applied. The arm 11 has a recess 13 formed in its outer side near its end and the recess has counterbores 14, 15 and 16 respectively.

A shaft 17 has one end mounted to rotate in the bore 14 and extends outwardly from the arm, carrying a handle bar 18 on its outer end by which it may be rotated. A spur pinion 19 is fastened on the shaft and is received in the recess 13. The pinion meshes with and drives a spur gear 20 which is confined in the recess and is internally threaded so as to travel on a left hand screw thread cut on a horizontal stud or spindle, 21. The gear has an extension in the form of a sleeve 22, also threaded likewise. The sleeve has a snug rotating fit in the bore 15; while a ball thrust-bearing 23 disposed in the bore 16 engages the inner side of the gear.

The stud has its outer end rigidly fastened in a vertical sleeve 24 at the center thereof. A yoke-shaped gate 25 has eyes 26 at its ends between which the sleeve 24 is received. A pivot bolt 27 is passed through the eyes and sleeve and fastened with a cotter pin 28. The gate has a U-shaped handle 29 extending horizontally and at right angles thereto, near its swinging end. The end or loop of the gate is engaged over the outer end of the arm 12 and is received in a notch 30. Inwardly of the notch an outwardly projecting U-shaped handle 31 is provided on the arm 12.

For retaining the pinion 19 and the gear 20 in the recess 13, whereby they are housed and protected from dirt and grit, a dust plate 32 punched to receive the shaft 17 and the stud 21 fits snugly in the recess, substantially flush with the surface of the arm 11. This plate is held by a cotter pin 33 passing through the ears 34 above and below the recess 13 (Fig. 6). The plate retains grease in the recess and when released permits the gearing to be removed. The sleeve 24 has a central bracket 35 at right angles to the stud and provided with seat 36 in which the shaft 17 is received and supported.

In using the gate it is swung to an open position as is shown in dotted lines or to a closed position, as is shown in full lines, in Fig. 1. When the gate is closed it engages in the notch 30. By turning the handle bar 18 in a clockwise direction the shaft 17 and pinion 19 are turned in a like direction, but the gear 20 is rotated by the pinion in a counter-clockwise direction and thus travels inwardly or away from the sleeve 24, on the left hand thread of the stud 21. This adjustment moves the arms 11 and 12 toward each other, because the gear rides against the thrust bearing 23 and urges the arm 11 toward the arm 12 at the same time the back pressure of the stud 21 is contributed to the gate 25, which pulls the arm 12 toward the arm 11.

When the arms are swung together the wire line (not shown) is clamped in the head 10. The thrust bearing 23 permits of an easy rotation of the gearing. The pinion and gear provide a reduction gearing, whereby not only the advantage of great leverage is had in clamp, but by means of which fine adjustments of the arms may be made. By revolving the handle 18 in a counter-clockwise direction the gear 20 is rotated in a clockwise direction and moved outwardly on the stud 21. This permits the gate to be swung from the arm 12 to a full open position as is shown in dotted lines in Fig. 1, so as not to interfere with the tool stem or bailer. In pulling the clamp onto the line the workman may grasp the handles 29 and 31 and readily position the clamp.

It is obvious that great pressure upon the line may be had with this gate by a few turns of the handle bar 18 and with a minimum exertion. The gate is quickly released and opened and is easily handled. Various changes in the size, shape and structure of the various parts as well as modifications and alterations may be made within the scope of the appended claims. It is also to be understood that the term gate as used herein is intended to cover any form of connection between the arms as it is obvious that structures other than a yoke could be used.

The arm 12 is provided with a depending stop lug 12' on its under side against which the gate 25 closes. The stop limits the closing movement and prevents injury to the hand of the operator.

What I claim, is:

1. In a clamp of the character described, the combination with a pair of clamping arms, of a gate adapted to engage with one of the arms, means carried by the other arm supporting the gate and for displacing it to bring the arms together, and a reduction gearing for operating said means including an actuating member for the said gearing.

2. In a clamp of the character described, the combination with a pair of clamping arms, of an adjusting member carried by one of the arms at its outer end, a gate hinged to swing upon said member and engaging the outer ends of the arms, a stop on one of the arms engaged by the gate, and a handle on said last named arm adjacent the stop.

3. In a clamp of the character described, the combination with a pair of clamping arms, of a swinging gate adapted to engage the arms, a threaded member on which the gate is pivotally mounted, an element threaded on the member and confined in one of the arms, and means for rotating said element to cause it to travel on said member.

4. In a clamp of the character described, the combination with a pair of clamping arms, of a swinging gate adapted to engage the arms, a screw threaded stud on which the gate is pivotally mounted, a gear threaded on the stud, a pinion meshing with the gear, and means for revolving the pinion.

5. In a clamp of the character described, the combination with a pair of clamping arms, of a swinging gate adapted to engage one of the arms, a screw threaded stud, a vertical sleeve carrying the stud and on which the gate is pivoted, a gear having a sleeve confined in the other arm and threaded on the stud, a shaft, a pinion fast on the shaft meshing with the gear, and means for revolving the shaft.

6. In a clamp of the character described, the combination with a pair of clamping arms, of a swinging gate adapted to engage one of the arms, a screw threaded stud, a vertical sleeve carrying the stud and on which the gate is pivoted, a gear having a sleeve confined in the other arm and threaded on the stud, a shaft, a pinion fast on the shaft meshing with the gear, means for revolving the shaft, the gear, sleeve and pinion being housed in said last named arm, a dust plate covering said gear, sleeve and pinion, and means for fastening the plate in place.

7. In a clamp of the character described, the combination with a pair of swinging clamping arms, of a swinging gate carried by one of the arms and engaging the other arm, a stop lug depending from the engaged arm in the path of the gate, and means carried by one of the arms for adjusting the carrying arm with relation to the gate to fasten and loosen the same.

In testimony whereof I affix my signature.

FRANK E. CROTTO.